June 1, 1926.

F. G. HENRY

GYROSCOPE STABILIZING SYSTEM

Filed August 4, 1925

Inventor
F. G. Henry.
By his Attorneys
Cooper, Kerr & Dunham

June 1, 1926.

F. G. HENRY 1,586,525

GYROSCOPE STABILIZING SYSTEM

Filed August 4, 1925    2 Sheets-Sheet 2

Inventor
F. G. Henry.
By his Attorneys
Cooper, Kerr & Dunham

Patented June 1, 1926.

1,586,525

UNITED STATES PATENT OFFICE.

FERDINAND GEORGE HENRY, OF NEW YORK, N. Y., ASSIGNOR TO FAIRCHILD AERIAL CAMERA CORPORATION, A CORPORATION OF NEW YORK.

GYROSCOPE STABILIZING SYSTEM.

Application filed August 4, 1925. Serial No. 48,163.

In the use of gyroscopes for "stabilizing" airplane cameras or other devices it is common practice to mount the gyroscope in pivotal supports, as for example suitable gimbal rings, with the axes of the gimbals or other supports passing through or as close as possible to the center of gravity of the gyroscope and the associated parts. The gyroscope is then said to be "neutrally" mounted, and as long as the rotor thereof is running at or above a certain speed, depending upon the design and construction of the system, the gyroscope will be stable. At lower speeds, however, the gyroscopic effect may not be sufficient, so that slight accidental unbalance may cause the gyroscope to swing far out of normal position. To obviate this difficulty I have devised my present invention, which has for its chief object the provision of means for automatically making the gyroscope pendulous at speeds below a predetermined minimum. Preferably this action is controlled by a device revolving with the gyroscope rotor and actuated by centrifugal force to close or open an electric circuit containing an electromagnet on the bottom of the gyroscope. Normally, that is, when the rotor is running at or above the predetermined speed, the circuit is closed, the magnet is energized and its armature is held up. At lower speeds the centrifugal device opens the circuit, the magnet is deenergized, and the armature falls. The mass of the armature and associated parts thus transferred to a lower position may be made to lower the center of gravity far enough below the gimbal axes to give adequate pendulous stability, but I prefer to provide an additional mass which the armature in its fall engages and connects to the gyroscope. It is thus possible to use a magnet and armature of small size and weight, requiring but little current, and yet add to the gyroscope at the proper time a mass of considerable magnitude. To these and other ends my invention comprises the novel features, elements, and combinations hereinafter described.

One form of the invention, designed for stabilizing an aerial camera, is illustrated in the accompanying drawings, in which—

Figure 1:
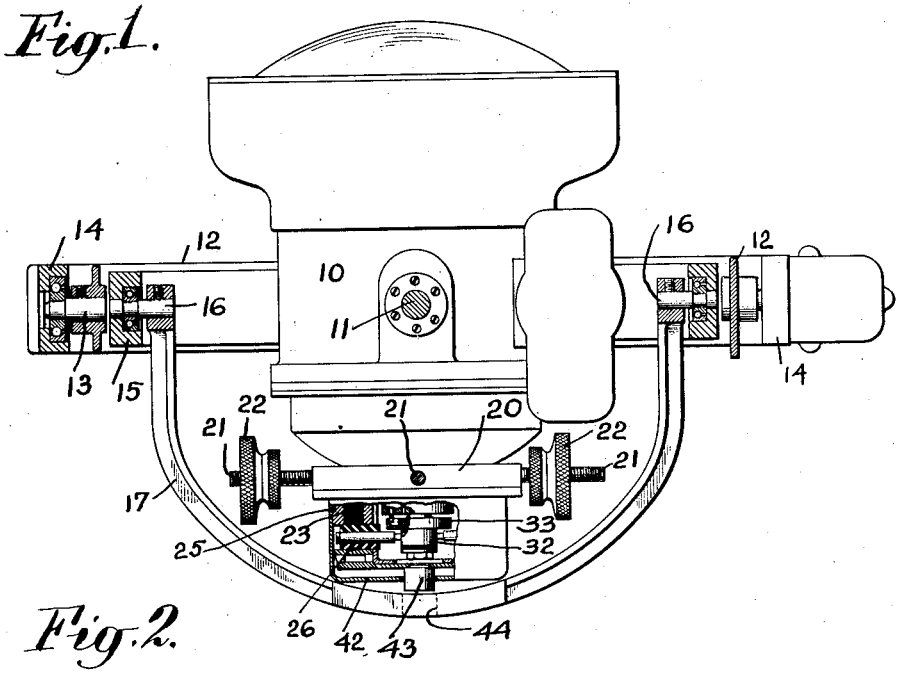
Fig. 1 is a side view of the gyroscope system, with the centrifugal switch mechanism in section.

The gyroscope 10 is provided with diametrically opposite trunnions, one of which is shown in section at 11, pivotally mounted in an inner gimbal ring 12, which is itself provided with diametrically opposite trunnions 13 pivotally mounted in the outer ring 14, the latter being supported in any convenient manner, not shown. Inside of the inner ring is an auxiliary ring 15 pivotally supported on the gyroscope trunnions 11 to swing freely thereon, and pivotally suspended from the auxiliary ring by means of trunnions 16 (alined with trunnions 13) is a bail-shaped or inverted U-shaped weight 17, passing under the gyroscope. The bail can, it will be noted, swing freely in all directions independently of the gyroscope.

On the bottom of the gyroscope, secured to a stationary or non-rotating part thereof, is a horizontal supporting plate 20, which may be provided with a plurality of radial screws as 21, say four in number, at right angles to each other, carrying adjustable balancing weights 22. Carried by the supporting plate, on the underside, is an annular electromagnet or solenoid 23, having cylindrical internal and external pole pieces 24, 25, extending below the magnet winding and provided below the latter with transverse openings to support the insulating brush carriers 26, more fully described hereinafter.

The shaft 30 of the gyroscope rotor (not shown) terminates above a central aperture in the plate 20. The shaft has an extension 31, extending downwardly through the aforesaid opening and carrying at its lower end an insulated contact sleeve 32 the upper part of which is enlarged radially, as indicated at 33, to receive a pair of contact pins 34 extending downwardly from the centrifugal switch member 35. The latter, and the contact sleeve 32, are insulated from each other, as indicated, and are firmly clamped on the shaft extension 31, as by means of the nut 36.

Figure 4:
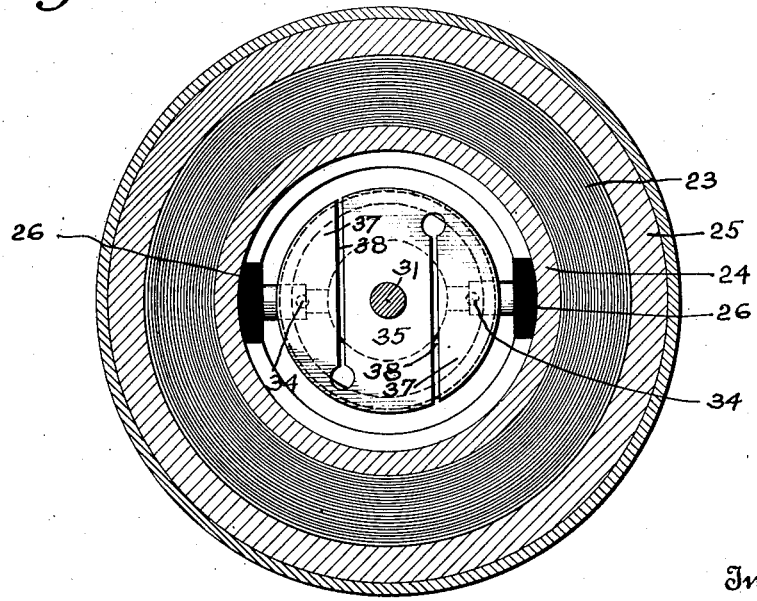
Fig. 4 is a sectional plan view on line 4—4 of Fig. 2.

The centrifugally responsive element or switch member 35 comprises a heavy disk of non-magnetic metal, having a pair of slits 38, Fig. 4, on opposite sides of the shaft 31 and extending inwardly from opposite sides of the disk, to provide a pair of spring arms 37. The contact pins 34 are carried by these spring arms and are so located thereon that when the speed of rotation is below a certain predetermined value the pins are out of contact with the contact sleeve 33. At any higher speed, however, the centrifugal force on the contact arms is sufficient to swing the same outwardly and bring the pins into engagement with the sleeve, thereby closing the magnet circuit, as will be explained hereinafter. Similarly, when the speed falls to or below the limiting value referred to, the arms contact and break the circuit.

The spring-actuated brushes 40, which bear on the narrower portion of the contact sleeve 32, are mounted in the insulating carriers 26. The brushes are connected in parallel to each other. Two brushes are provided, as are also two spring arms on the centrifugal switch member, for more certain operation and also to permit perfect balancing of the mechanism with less difference in the positions of the balancing weights 22.

The armature 41 of the magnet 23 is in the form of a tubular plunger, slotted vertically to accommodate the inwardly extending brush-carriers 26, and carrying at its lower end a disk 42 from which depends a stud 43 adapted to enter a hole 44 in the bail or weight 17 when the armature descends after deenergization of the magnet.

Figure 2:
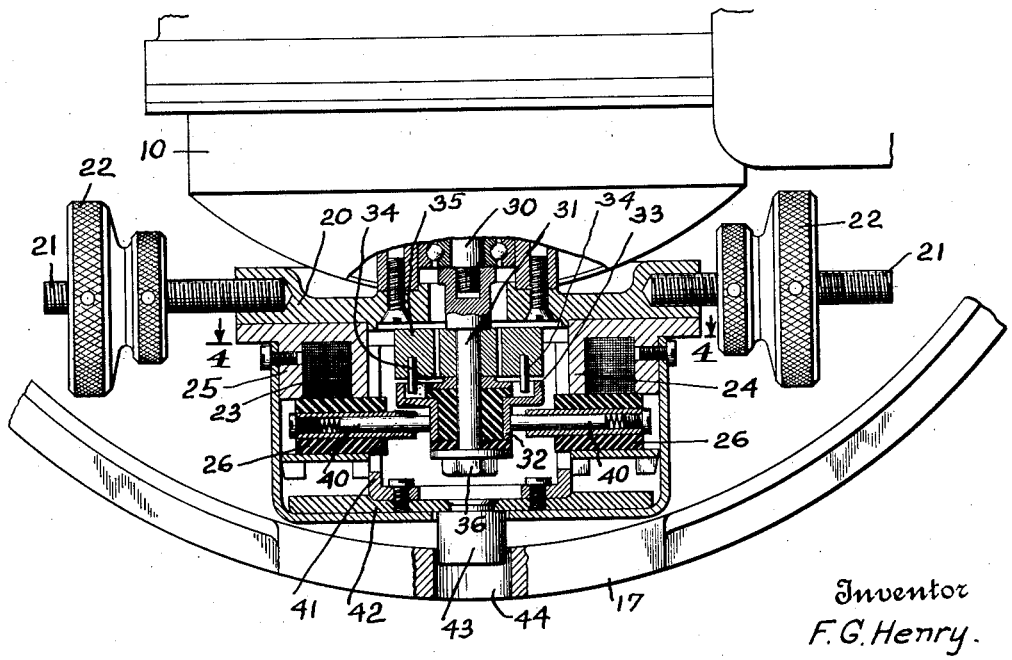
Fig. 2 is a detail sectional view of the switch mechanism and the electromagnet.
Figure 3:
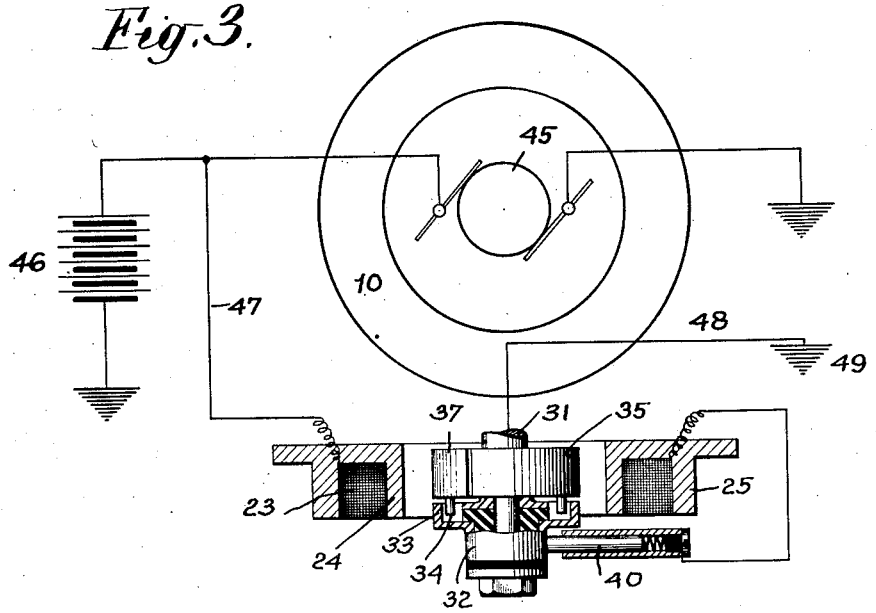
Fig. 3 is a diagram showing the wiring of the control system.

Upon reference to the wiring diagram, Fig. 3, it will be seen that the magnet 23 is in parallel with the gyroscope driving motor 45. When the gyroscope is running at or above the predetermined speed the contact arms 37 are held out by centrifugal force (since, as will be understood, the centrifugal switch member or disk which carries the arms rotates with the gyroscope rotor) with the contact pins bearing against the rotating contact sleeve 32—33. The magnet circuit is then complete, as follows: current source 46, wire 47, magnet 23, brushes 40, sleeve 32—33, pins 34 and disk 35, shaft 31, wire 48, to ground. Being thus energized, the magnet holds its armature up, keeping the stud 43, Fig. 2, out of engagement with the bail 17, so that the latter is disconnected from the gyroscope. At lower speed, however, the circuit just traced is open at the contact pins 34, and the magnet, no longer energized, allows the armature to descend, causing the stud 43 to enter the opening 44 in the bail or weight 17. The latter is thus operatively connected to the gyroscope. If the latter swings, it must carry the bail with it. In effect, if not actually, the mass of the bail is added to the gyroscope below the gimbal axes, thus lowering the center of gravity correspondingly, so that the center of gravity is no longer coincident with the intersection of the gimbal axes but is in a position substantially below such intersection. The gyroscope is now pendulously mounted and therefore tends to stand with its axis vertical and to return to such position if displaced.

The speed at which the centrifugal switch operates to open or close the magnet circuit depends upon several factors, as for example the mass of the contact arms, the resiliency or stiffness of the connection between the same and the body of the disk, and the angle through which they must swing to bring the contact pins into engagement with the contact sleeve, so that by suitable design and construction any desired speed can be predetermined within permissible limits. Preferably the predetermined speed is well above that at which the gyroscope becomes unstable, that is, above the speed at which the "gyroscope effect" is sufficient to keep the axis in the normal position, so that the apparatus will be stabilized with certainty at any lower speed.

It is to be understood that the invention is not limited to the construction herein specifically illustrated and described but can be embodied in other forms without departure from its spirit.

I claim—

1. The combination with a pivotally mounted gyroscope, of means responsive to the speed of the gyroscope to displace the center of gravity of the gyroscope relatively to its pivotal axis at a predetermined speed.

2. The combination with a pivotally mounted gyroscope, of means for increasing and decreasing the effective weight of the gyroscope below its pivotal axis, and mechanism for actuating said means, including a speed-responsive member rotating in harmony with the gyroscope to cause actuation of said mechanism at a predetermined speed.

3. The combination with a gyroscope, and a pivotal mounting therefor, in which the gyroscope is normally in substantially neutral equilibrium on at least one transverse axis, of automatic means operating at a predetermined speed of the gyroscope to add weight thereto below said transverse axis.

4. The combination with a gyroscope pivotally mounted on an axis transverse to its axis of rotation, of a weight pivoted to swing under the gyroscope on said transverse axis, and automatic means for connecting the weight to the gyroscope at a predetermined speed of the latter.

5. The combination with a gyroscope neutrally mounted on a pair of perpendicular axes transverse to the gyroscope axis, of a pendulously mounted weight, an electromagnet carried by the gyroscope, an armature therefor having means to engage the weight and thereby connect the same to the gyroscope to displace the center of gravity thereof with respect to said transverse axes, an energizing circuit for the magnet, and a centrifugal controlling switch for said circuit, rotating in harmony with the gyroscope for operation at a predetermined speed thereof.

6. The combination with a pivotally mounted gyroscope, of a pendulous weight, a non-rotating electromagnet carried by the gyroscope having an armature adapted to engage said weight, a contact sleeve carried by the gyroscope and rotating in harmony therewith, a centrifugally actuated member rotating in harmony with said sleeve to engage and disengage the same as the speed of the gyroscope varies, and an energizing circuit for the magnet, in series with the sleeve and centrifugally actuated member.

7. The combination with a pivotally mounted gyroscope having a rotor shaft and a pivoted weight adjacent thereto, of means for connecting the weight to and disconnecting the same from the gyroscope as the speed of the latter varies with respect to a predetermined value, comprising a non-rotating electromagnet carried by the gyroscope, an armature actuated by the magnet and adapted to engage and disengage said weight, a contact sleeve coaxial with and rotated by the gyroscope rotor shaft, a centrifugal switch member coaxial with and rotated by the rotor shaft, having arms movable radially inwardly and outwardly as the speed of the rotor shaft varies and provided with contact pins to cooperate with said sleeve, and an energizing circuit for the magnet, in series with the said sleeve and pins.

In testimony whereof I hereto affix my signature.

FERDINAND GEORGE HENRY.